US011307962B2

(12) United States Patent
Landsborough et al.

(10) Patent No.: US 11,307,962 B2
(45) Date of Patent: Apr. 19, 2022

(54) METHOD FOR SEMANTIC PRESERVING TRANSFORM MUTATION DISCOVERY AND VETTING

(71) Applicant: The United States of America as represented by the Secretary of the Navy, San Diego, CA (US)

(72) Inventors: Jason A. Landsborough, San Diego, CA (US); Sunny J. Fugate, San Diego, CA (US); Stephen T. Harding, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 487 days.

(21) Appl. No.: 16/030,549

(22) Filed: Jul. 9, 2018

(65) Prior Publication Data

US 2020/0012581 A1 Jan. 9, 2020

(51) Int. Cl.
*G06F 11/36* (2006.01)
(52) U.S. Cl.
CPC ...... *G06F 11/3608* (2013.01); *G06F 11/3688* (2013.01); *G06F 11/3692* (2013.01)
(58) Field of Classification Search
CPC .. G06F 11/3604; G06F 11/3668; G06F 11/26; G06F 11/3608; G06F 11/3688; G06F 11/3692; G06F 11/36
USPC ........................................................ 717/124
See application file for complete search history.

(56) References Cited

U.S. PATENT DOCUMENTS

| 5,371,883 | A | 12/1994 | Gross et al. |
| 6,071,316 | A | 6/2000 | Goossen et al. |
| 6,173,440 | B1 | 1/2001 | Darty |
| 6,286,130 | B1 | 9/2001 | Poulsen et al. |
| 6,668,325 | B1 | 12/2003 | Collberg et al. |
| 7,430,670 | B1 | 9/2008 | Horning et al. |
| 7,430,733 | B1 * | 9/2008 | Yaari ................. G06F 8/75 717/141 |
| 7,757,215 | B1 * | 7/2010 | Zhou .............. G06F 11/3644 714/2 |

(Continued)

OTHER PUBLICATIONS

Jia et al;"An Analysis and Survey of the Development of Mutation Testing";31 pages (Year: 2010).*

(Continued)

*Primary Examiner* — Wei Y Zhen
*Assistant Examiner* — Brahim Bourzik
(74) *Attorney, Agent, or Firm* — Naval Information Warfare Center, Pacific; Kyle Eppele; James R. McGee

(57) ABSTRACT

A method for validating software transforms. A target program binary is mutated, producing a plurality of variants. It is determined whether each variant passes a test suite. Upon determining the variant does not pass the test suite, the variant is discarded. Upon determining the variant passes the test suite, the variant is compared to the target program binary. A candidate transform is extracted which meets scope criteria. The candidate transform is applied to each of a plurality of test programs. It is determined whether the candidate transform is safe. Upon determining that the candidate transform is not safe, the candidate transform is discarded. Upon determining that the candidate transform is safe, the candidate transform is collected.

20 Claims, 6 Drawing Sheets

(56) References Cited

U.S. PATENT DOCUMENTS

2004/0163078 A1\* 8/2004 Correa .................... G06F 8/654
717/130
2004/0225996 A1\* 11/2004 Venkatesan ............. G06F 8/658
717/100

OTHER PUBLICATIONS

Mohan et al ("Source-Free Binary Mutation for Offense and Defense: chapter 6" (Year: 2014).\*
Delmaro et al;"Proteum/IM 2.0: An Integrated Mutation Testing Environment";11 pages (Year: 2001).\*
Anderson et al ;"Mutation Testing"; 25 pages (Year: 2011).\*

\* cited by examiner

Mutation Operations:

| Program | Bytes Changed | Percentage changed |
|---|---|---|
| base64 | 8694 | 52.266 |
| basename | 8495 | 69.166 |
| cat | 21013 | 71.898 |
| chcon | 27968 | 88.077 |
| chgrp | 25301 | 67.621 |
| chmod | 16959 | 54.171 |
| chown | 19745 | 58.303 |
| chroot | 13266 | 79.371 |
| comm | 9001 | 57.484 |
| cp | 28285 | 40.181 |
| csplit | 9499 | 41.820 |
| cut | 9885 | 54.644 |
| date | 13654 | 38.761 |
| dd | 14537 | 45.482 |
| df | 33181 | 60.715 |
| dircolors | 10784 | 68.314 |

FIG. 3

```
Original assembly:
  mov    %rsi,(%r12)
  je     404054 close_stdout+0x1154>

Transformed assembly:
  lea    0x39f4(%rip),%rax
  # 407a32 <version_etc_copyright+0xa12
  nop
  nop
```

FIG. 6

METHOD FOR SEMANTIC PRESERVING TRANSFORM MUTATION DISCOVERY AND VETTING

FEDERALLY SPONSORED RESEARCH AND DEVELOPMENT

The Method for Semantic Preserving Transform Mutation Discovery and Vetting is assigned to the United States Government and is available for licensing and commercial purposes. Licensing and technical inquiries may be directed to the Office of Research and Technical Applications, Space and Naval Warfare Systems Center Pacific (Code 72120), 53560 Hull Street, San Diego, Calif., 92152, via telephone at (619) 553-2778, or email at ssc_pac_t2@navy.mil. Reference Navy Case 108622 in all communications.

BACKGROUND OF THE INVENTION

1. Field of the Invention

The present invention relates generally to genetic algorithm driven automated program modification, and in particular to a method for validating transformations extracted from the genetic modification of software.

2. Description of the Related Art

Modern software represents the combined effort of human ingenuity, diverse and sophisticated libraries, as well as robust software compilers and interpreters. Modern software "works" because of the stability and determinism of modern compilers. The automated symbol manipulation systems within modern optimizing compilers are capable of achieving large performance gains. However, the automated manipulations of software as a symbol system rely primarily on deliberately created semantics-preserving software transforms (which are created by human intervention). As software grows in complexity, developers and researchers have sought to simply programs. Traditional approaches to software simplification have generally sought to hide complexity using abstraction.

Currently, software evolves primarily as the result of human requirements and manipulations in that as new software is created, old software is integrated or discarded. In this way, the software ecosystem slowly evolves. As such, this "software ecosystem" is not a natural one. While there are market pressures which drive definitive trends in software development, prior art software applications didn't evolve over time due to any form of truly natural selection. With few exceptions, once compiled, prior art software was fixed, and any evolution of the software over time resulted from deliberate design driven by artificial selection pressures.

A genetic algorithm is a biologically-inspired algorithm that uses mutation and selection for optimization. Research efforts over the past two decades have focused on exploring software optimization and genetic improvements, utilizing search-based techniques for purposes such as program optimization, energy efficiency optimization, program feature modification, automated debugging, feature removal, or general program improvement. However, prior efforts on in-place program binary modification using genetic algorithms have had limited utility. While the prior art demonstrates the feasibility of genetic algorithm driven program modification, the prior art has generally been limited in terms of the changes which can be made (in order to ensure program safety properties are preserved after the transformation). In the prior art, ad hoc mutation of software could generally be performed only when safety was not important, or when some other criteria such as performance was paramount and overrode safety concerns. Prior art test suites generally provided no guarantee of program reliability, correctness, or safety. For example, removing all unused features from a program in order to limit attack surfaces would also result in the removal of any and all code not specifically affecting program test results. In general, prior art program modification processes are unsafe, as they may result in a number of changes which can have unintended side-effects. Modifications which may pass test cases can nevertheless remove, disable, or render inoperative critical features and safety elements built-into the original program but which are not covered by the test suite. Limiting the changes to a set of specific features however, could be performed relatively safety.

Prior art genetic algorithms used to modify programs were convenient in their generality, but incredibly costly in terms of computational cost. Using prior art genetic algorithms and test suites to create randomized variants of a particular program would be impractical, as the resulting binaries would likely be both fault-prone and expensive to produce in terms of computing cost. Where the fitness criterion is explicitly known however, prior art approaches such as the delta-debugging technique can overcome some of the safety-related difficulties. This delta-debugging algorithm takes an input that produces a crash or failure and repeatedly runs slightly modified versions of the input until it has produced the smallest set of inputs that exhibits the crash. The algorithm uses a memorized binary search to produce output. The prior art has also demonstrated that genetic algorithms can be used to improve existing software. For example, it is possible to fix bugs in existing C programs through manipulation of an abstract syntax tree at the statement level. Similarly, it is possible to repair a program through mutation of its assembly code as opposed to the source code.

The prior art has also demonstrated that genetic algorithm-based programming techniques can be used to remove unwanted or unused program functionality while still allowing the resultant variant to successfully pass its test suite. By providing test cases which only contain desired program features, it is possible to remove the undesirable program features. When coupled with the delta-debugging algorithm, it is possible to create a minimal set of changes that nevertheless removes the unwanted functionality. Prior art research has also demonstrated that only a very small amount of source code in a large corpus of Java projects (approximately 4%) is distinctive. In the prior art, a neutral mutant has been defined as a mutated program which may be semantically different but nevertheless fulfills the program specification as defined by its test suite. The prior art has shown that on average, more than 30% of program mutations are neutral. Additionally, it is colloquially understood that for any sufficiently complex program, there are an essentially unlimited number of semantically equivalent program variants. While the "whole program" semantics between two program variants may be identical, the instruction-by-instruction semantics can differ extensively. As a result, it can be possible to generate programs which use different instructions and instruction-level semantics yet still meet the same external criteria for functionality.

SUMMARY OF THE INVENTION

The present invention is a method for validating software transforms. A target program binary is mutated, producing a plurality of variants. It is determined whether each variant passes a test suite. Upon determining the variant does not pass the test suite, the variant is discarded. Upon determining the variant passes the test suite, the variant is compared to the target program binary. A candidate transform is extracted which meets scope criteria. The candidate transform is applied to each of a plurality of test programs. It is determined whether the candidate transform is safe. Upon determining that the candidate transform is not safe, the candidate transform is discarded. Upon determining that the candidate transform is safe, the candidate transform is collected.

BRIEF DESCRIPTION OF THE DRAWINGS

Throughout the several views, like elements are referenced using like elements. The elements in the figures are not drawn to scale, and some dimensions may be exaggerated for clarity.

FIG. 3 is a table depicting the percentage of executable code modified in variants generated in one embodiment of the present invention.

FIG. 6 depicts an assembly candidate transform.

DETAILED DESCRIPTION OF THE INVENTION

There are many benefits to removing complexity from software. Particularly, there are even greater benefits to removing complexity from software using automated methods. The present inventive method is built on at least three foundational principles: (1) software is generally robust to mutational change; (2) whole-program validity is a sufficient measure of safety for many situations; and (3) software is only ever as robust or valid as its test-suite. The present inventive method diverges from formal methods of software verification, instead contemplating novel and creative methods for mutating and evolving software, extracting useful software transforms from the ecosystem of program variants resulting from evolution using traditional genetic algorithm approaches. The present inventive method relies on an empirical approach to discovering and extracting software transforms. Described generally, the empirical approach will use observations of functionally equivalent programs, look at the program differences to discover candidate transforms, then perform empirical measurements testing the success or failure of these transforms in new program contexts.

Figure 1:
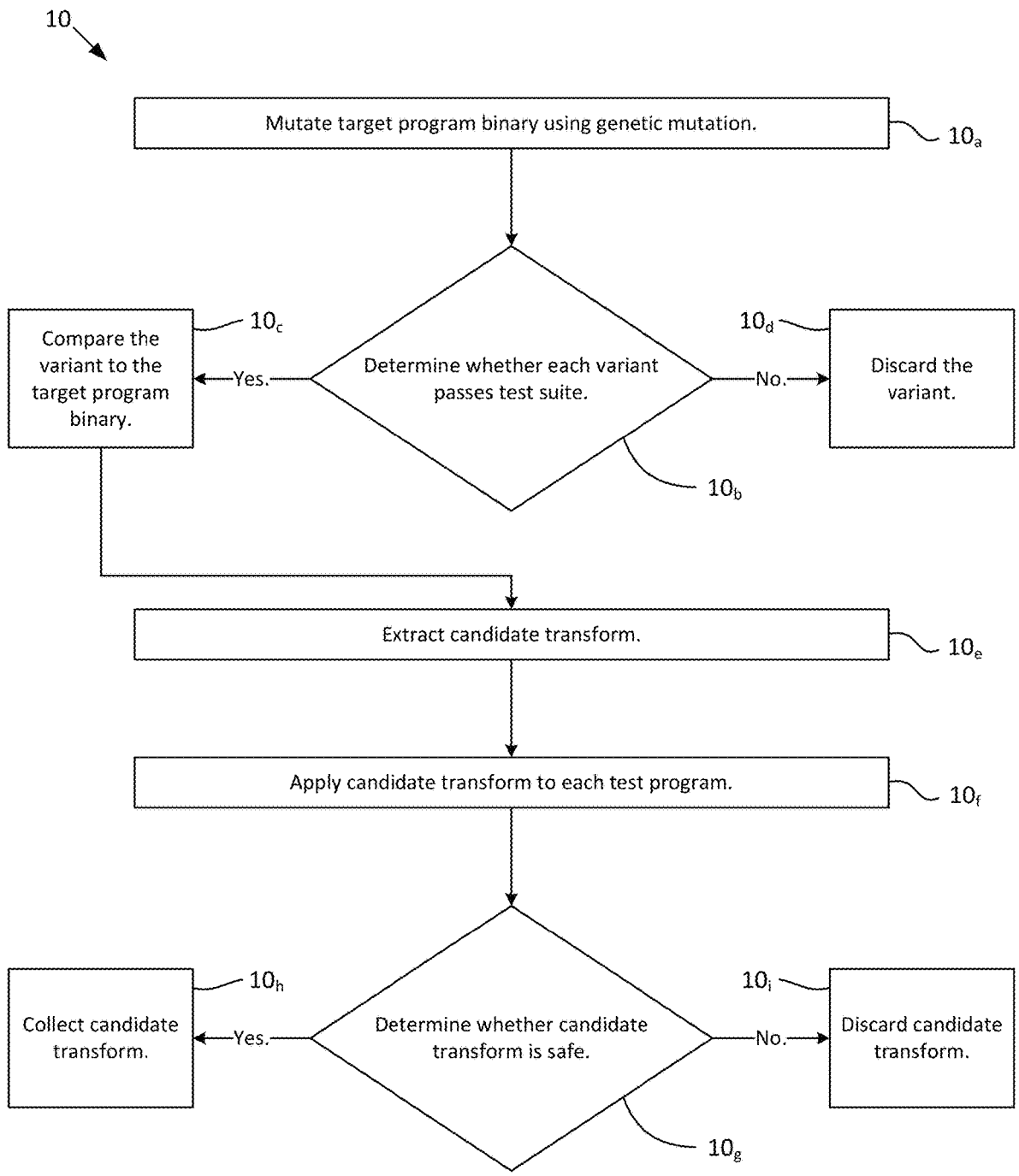
FIG. 1 is a flowchart of a method for validating software transforms, in accordance with one embodiment of the present invention.

The present inventive Method 10 (depicted in FIG. 1) takes a very different approach to automated program modification when compared with optimizing compiler-driven software transformation in that programs (target binaries) are mutated arbitrarily, Step $10_a$, program behavior (each mutated variant) is validated only cursorily, Step $10_b$, and then each program modification (each candidate transform) is extracted and explored for safety and validity afterwards. Generally, it is difficult to ensure the correctness of transformations to a particular program if its test suite does not sufficiently cover the program behavior being tested for. It is even more difficult to ensure the correctness of a transformation where test suites for the program are not available.

However, Method 10 applies candidate transforms to test programs (which are not necessarily the original target program binary [the original program subject to genetic algorithm mutation]) for which test suites do exist and are accessible, Step $10_f$. By applying candidate transforms to these test programs, Method 10 is able to leverage the test suites from the test programs to independently verify candidate transforms which are not covered in the original target program binary's test suite (or permit testing of the candidate transforms in the first instance in the scenario where the original target program binary's test suite is not available or does not exist). In the ideal case, this would not be necessary, as target binaries would have test suites with perfect coverage. However, in the real world, this is often far from reality. Often, target binaries have test suites with less than perfect coverage or are delivered without test suites due to rushed deliverable schedules, or simply because the user has access only to the target program binary as a standalone binary without test suites (as closed-source software is typically delivered).

A variant may be a software program that has been modified from its original content (for example, the original target program binary) so that it is different by at least one bit. However, variants may also be different by many hundreds or thousands of bits, bytes, machine code instructions, assembly instructions, operands, registers, values, intermediate language instructions, source code instructions, functional calls (including new function calls), function declarations, declarations, assignments, control flow statements, constants, numeric values, register references, memory references, and other program elements. These modifications can be at the binary level, where some number of individual bits are modified. The modification can be performed at the machine-code level where machine instructions are modified.

Variants may be produced by modification or transformation of many different program elements. The program elements which may be modified can be: the raw bits and/or bytes of a program; modification or transformation of machine code instructions; modification or transformation of intermediate language program representations; modification or transformation of disassembled programs; modification or transformation of assembly code instructions; or modification of source code of a program prior to compilation. Modifications may also consist of many different operations, some of which are common types of transformations used within genetic algorithms. Modifications at the machine code, assembly code, and/or intermediate language levels might consist of: deleting instructions; modifying the internal operands of instructions; modifying the values within instructions; combining two or more instructions; adding one or more additional instructions; swapping the location of instructions; swapping the order of two or more instructions; padding instructions; modifying the operands of instructions; modifying constant values; modifying register references; modifying memory references; or any other modification which could be performed of assembly code, machine code, or intermediate language representations. Similar modifications could be performed to the raw bits and bytes of a program before, during, or after compilation, or before or after disassembly. Individual bits may also be manipulated, changing their value from 1 to 0 (or vice versa), or bits may be swapped, added, removed, or combined using bit operations. The raw bytes of a program can be modified in a similar fashion.

The present inventive Method 10 focuses on modifying the target program binary itself in order to allow for the improvement of software whose source code is not available. Among other things, Method 10 allows the removal of unwanted, unused, or vulnerable code. Simultaneously, Method 10 may support methods for performing instruction-level randomization of programs in order to protect software against code reuse attacks. Using Method 10, it is possible to build a larger catalog of potential software transforms for a target program binary than would be feasible using conventional techniques. While a traditional patch routine overwrites specific program blocks based on differences between two binaries, an improved program transform routine incorporating Method 10 could iteratively (and potentially randomly) apply multiple, independent patches to target binaries in order to safely affect their size, features, performance, and security-related properties.

In contrast to the prior art approaches to genetic algorithm-based program modification (where the fitness function of the algorithm is explicitly known), in the present inventive Method 10, the fitness function's primary purpose is to maintain program validity while allowing the individual population's members to drift. Essentially, the variants created are a set of neutral variants because each variant is created so they can be compared to the target program binary, Step $10_c$. Each difference between a mutated population member (each variant) and the original program (the target program binary) can then become a potential semantics-preserving transformation when it is extracted as a candidate transform, Step $10_e$.

There are benefits to discovering candidate transforms using Method 10 when compared with processes where transforms which are known to be useful are simply created by software engineers and scientists. In building a library of collected candidate transforms which are not necessarily created by a software engineer for a specific purpose, Step $10_h$, useful properties may be gained by learning from these "naturally created" or "wild" software transforms. For example, for some use cases, it might be desirable to use only transforms that make a program smaller, perhaps at the expense of performance. In other use cases, it might be beneficial to make the total computational cost of two parallel paths equal, even if the paths perform fundamentally different operations. In essence, application of Method 10 provides ample opportunity for the discovery, collection, and cataloging of a large number of useful program transforms which could play important roles in future software development, construction, deployment, and protection. Method 10 focuses on empirical methods for transform discovery and not on formal analysis or verification. While the empirical measurements contemplated by Method 10 do not represent a proof of correctness, they nevertheless provide a rough estimate of the validity of each tested candidate transform. Step $10_g$.

The overall approach of Method 10 consists of the following steps: (1) mutating the target program binary in place, producing a plurality of variants, Step $10_a$; (2) testing each variant for validity using a test suite, Step $10_b$; (3) discarding variants which fail, Step $10_d$; (4) comparing each variant that passes to the original program (the target program binary), Step $10_c$; (5) extracting candidate transforms which meet the scope criteria, Step $10_e$; (6) for each candidate transform, applying it to each of a pool of test programs, Step $10_f$; (7) for each test program, validating the transformed binary using available unit test, determining whether the candidate transform is safe, Step $10_g$; and (8) collecting safe candidate transforms for further testing and manual analysis, Step $10_h$. Unsafe candidate transforms are discarded. Step $10_i$.

Figure 2:
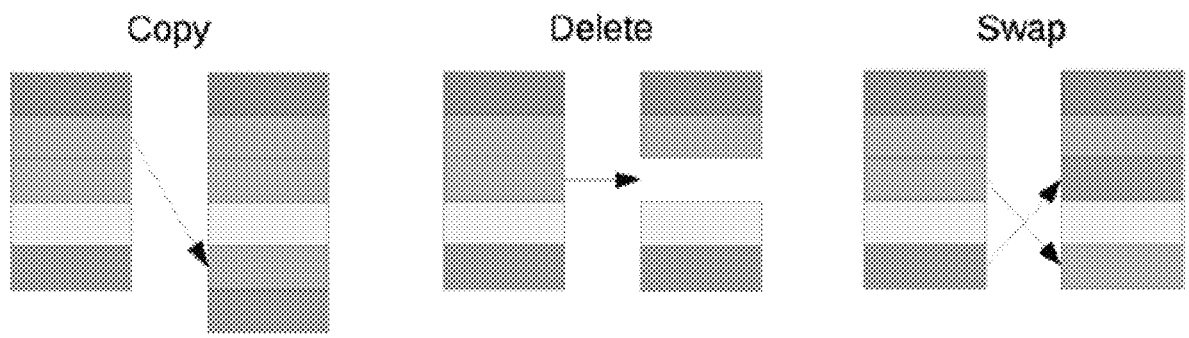
FIG. 2 depicts mutation operations according to one embodiment of the present invention.
Figure 2:
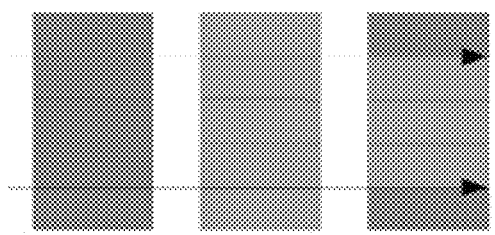

Method 10 uses a genetic algorithm. A genetic algorithm comprises a population of candidates (for example, the target binaries at Step $10_a$) which are mutated and combined to create new individuals within the population. This population is maintained through selection. While multiple methods of selection are available, Method 10 uses tournament selection. In tournament selection, multiple candidates are compared, and the one with the best fitness is selected to evolve, while the one with a worse fitness is rejected from the population. The fitness of each candidate is determined using a fitness function. In the case of evolving software, the fitness function includes validation using some number of test cases. Individuals that fail test cases will get a bad fitness score. Individuals that pass the test cases are given a fitness which is measured by the desired optimization or specialization criteria (such as program size, program performance, program energy usage, or program diversity). Mutations are probabilistic changes to an individual. The mutation operations used for evolving software can include inserting code, swapping two code snippets, and deleting code. New individuals are created using crossover as a combination technique, where one or more points at the same spot in Program A and Program B are selected, and the code is swapped after the crossover point. For example, the result of a two-point crossover is that the resultant program contains the code from the start of the first program, Program A, to the first offset, then the code from the second program, Program B, to the second offset, and then the rest of Program A after the second offset. FIG. 2 depicts mutation and crossover operations visually.

In one embodiment of Method 10, the initial pool of candidate transforms was extracted from a group of variants which had been processed by a genetic algorithm to make as many changes to a target program binary as possible while still passing the target program binary's test suite. During implementation of Method 10, 16 programs within the set of GNU core utilities coreutils were mutated at Step $10_a$: base64, basename, cat, chcon, chgrp, chmod, chown, chroot, comm, cp, csplit, cut, date, dd, df, and discolors. Program variants were generated at Step $10_a$ using crossover with tournament selection as well as three possible mutation operations: copy, delete, and swap. For crossover, two-point crossover was used, with the two offsets chosen at where both programs have instructions at both offsets. The resulting variants contained instructions from one of the programs up to the first offset, instructions from the second program up to the second offset, and the remainder of the instructions from the first program. The offsets for the mutation operations were computed using the GNU binary objdump utility. The genetic algorithm terminated after a specified number of fitness evaluations and used a population size of 512. The algorithms were run on a 64-bit computer with 64 central processing units (CPUs) and 512 gigabytes (GB) of random access memory (RAM), with tests assigned across 16 virtual machines with 2 GB of RAM and two CPU cores each. This configuration allowed for the reloading of a virtual machine in the event that the virtual machine hung due to faulty programs, such as from writing too much data and filling up disk space. Runs for the genetic algorithm on a given program were terminated after 500,000 fitness evaluations, and ranged from a few days to a week (depending on the performance of the program's test suite).

All transform operations at Step $10_f$ were performed on the raw bytes of the binary image of the program as an executable file on disk. For a given transform and target program binary, the target program binary was searched for a sequence of bytes which matched the original instruction bytes and overridden with the bytes in the modified instruction bytes. This approach is very straightforward and allows for fast program mutation. FIG. 3 shows the percentage of executable code in bytes modified in the resulting binaries (variants) generated by running the genetic algorithm on the coreutil binaries for 500,000 evaluations. There was approximately a 50 percent change in the bytes in the executable sections of each of the binaries with a few notable outliers. For example, chcon had 88 percent of its executable code modified. This anomaly may be explained by the fact that chcon is used to change the SELinux security context for files. As the SELinux module was not used, some tests may have been skipped or failed to produce a fail condition due to early termination. In other cases, programs worked correctly, but had minor issues such as unusual characters or words in the usage (or help) output. These results further emphasize the dependence on test suites and the need for test suites with a good level of program coverage in order to reduce the risk of faulty transforms at Step $10_b$.

At Step $10_c$, from the modified binaries (the variants), candidate transforms are located by comparing na disassembled output of the target program binary with a disassembled output of a variant produced by the genetic mutation process. In one embodiment of Method 10, any differences in the machine code reported by the diff command in Linux (or some equivalent function) are considered a potential candidate transform. These candidate transforms are extracted and stored, Step $10_e$, for application to test programs later, Step $10_f$. To quickly discard candidate transforms that may be unsafe or machine or program specific, a single instance of each transform was applied to other binaries in the test set.

There are at least three techniques which may be used to locate potential transforms at Step $10_c$. The first technique is comparing a variant with the original target program binary using the diff command. This is the simplest and most straightforward method of candidate transform discovery. Given an original target program binary and a function-preserving variant, it is possible to compare the machine code of the two programs, and any differences in the machine code can be extracted as candidate transforms. Step $10_e$. This method may also reveal potential transform chains. A transform chain is considered an initial transform that leaves the machine code in such a state such that a second transform can be applied to the location changed by the initial transform. However, care must be taken when dealing with a transform chain (as it is possible to chain enough transforms to form a cycle).

A second technique is that subsets can be taken of each candidate transform. In the case where a safe transform has been identified using the first technique (the diff technique), for some transforms, there may be a subset of other transforms within the larger change (the initial candidate transform). These new transforms may be either novel transforms or previously discovered transforms. A third technique is to take supersets with adjacent context (a windowing of the diff technique). This method involves including some of the unchanged instructions from both before and after the transform. For any given transform, supersets consisting of the original candidate transform as well as adjacent instructions selected using a sliding window of one to three or more instructions both before and after the candidate transform may be considered.

Figure 4:
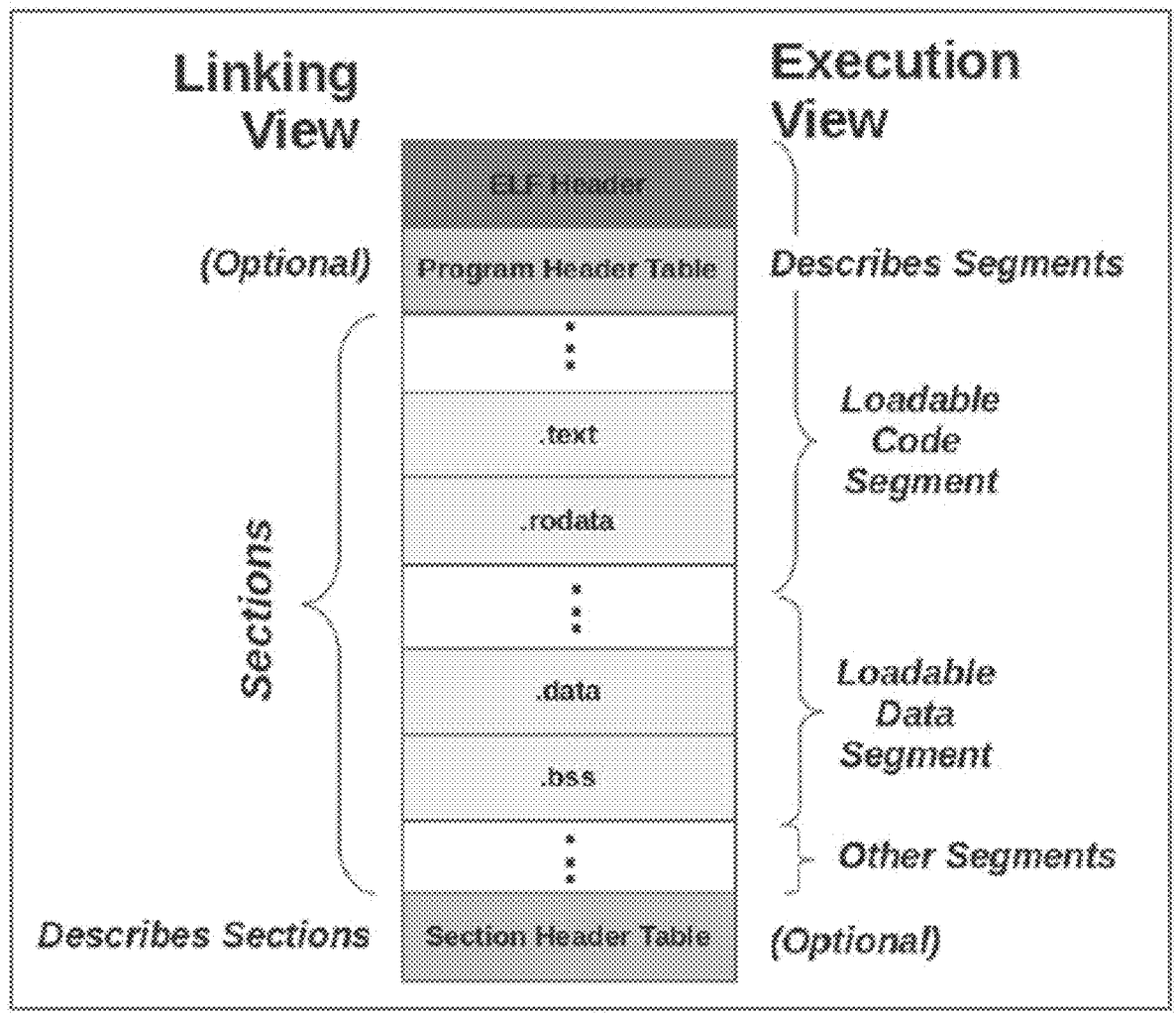
FIG. 4 depicts the structure of a Linux executable file.
Figure 5:
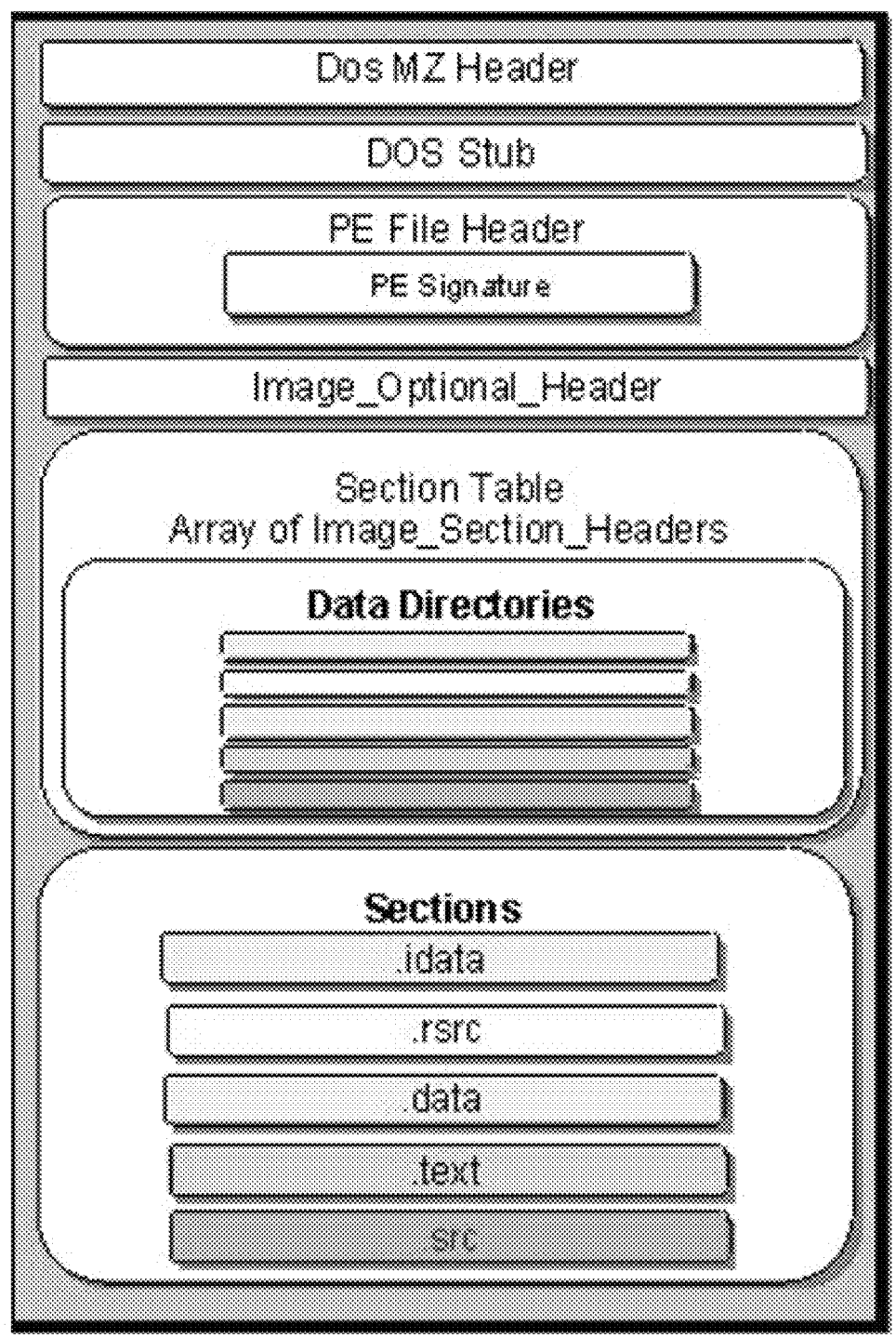
FIG. 5 depicts the structure of a Windows executable file.

For each candidate transform, tests are performed to ensure that the candidate transform is generalizable across other programs, Steps $10_f$ and $10_g$. This is accomplished by applying the candidate transform to a selection of test programs, Step $10_f$. Application of each candidate transform is limited to the executable section of the binary (such as the .text portion). See FIG. 4 for the structure of a Linux executable, and FIG. 5 for the structure of a Windows executable. This retains transforms which cannot be safely applied to modify data while also limiting the search space for useful transforms. A safe transform at Step $10_g$ is defined as satisfying the following condition: "Given a program P, a binary transform T, and a program variant P' such that P'=T(P), T is considered a safe transform if P and P' are functionally equivalent (defined as P and P' passing a common test suite)." This testing approach is sufficient to ensuring that a transform is safe in terms of "whole program" validity. Under this approach, the specific semantics of the transform in question may violate program validity if assessed in terms of internal instruction-by-instruction semantics. However, the safety claim at Step $10_g$ under this approach will be limited by the validity and coverage of the test suite used. A test suite with poor coverage, for example, will result in transforms of limited validity.

In summary, after the candidate transform is applied to each test program at Step $10_f$, the modified test program is run through a series of test cases, Step $10_g$. A single candidate transform is exhaustively applied to each member of the set of test programs (applied to the binary), with the modified program run through the unit tests associated with that program. Any candidate transform applied to a test program which subsequently fails one of its unit tests is rejected as unsafe at Step $10_g$, and that candidate transform is discarded, Step $10_i$. Any candidate transform that is unable to be applied to any of the test programs is not rejected as unsafe per se, but still removed from the pool of candidate transforms and discarded at Step $10_i$. In other words, a candidate transform must be applied to at least one program in the test program set, and that modified program must pass all of the associated unit tests for the candidate transform to be collected at Step $10_h$.

In the embodiment of Method 10 described previously where the method was applied to programs from the version 8.25 release of coreutils, the original genetic algorithm population yielded a large number of transforms that worked without impact to test-based validation in at least one of the Linux coreutils. However, this number is a small subset of the total candidate transforms. As shown in FIG. 3, some variants consisted of entirely modified instructions. Using test cases with better test coverage would reduce the overall number of candidate transforms, but likely increase the percentage of valid transforms. Results of this test are summarized below:

Original candidates from genetic algorithm population: 11,878

Transforms working in ≥1 coreutils: 3,445

Transforms working in >1 coreutils: 2,041

Of the 3,445 validated candidate transforms, 50 were found in all 107 of the test coreutils. On average, transforms were applied to 32 of the 107 test programs. These values may be large because the programs were all compiled on the same system using the same compiler. More candidate transforms may be further eliminated by applying them in combination to test programs, or by applying the transforms to programs compiled with a compiler other than the GNU Compiler Collection (GCC).

While many of the candidate transforms discovered by application of Method 10 to the coreutils binaries consisted simply of deleting instructions by replacing them with an amount of no operations (NOPs) of equivalent instruction length, this application yielded a number of transforms which performed more interesting modifications. For example, the transform in FIG. 6 performs exactly the same function but uses different instructions and different computations for the offset. This transform occurred in almost all of the coreutils, and appears simply to be performing cleanup of open files during program termination. This transform short-circuits the call to close stdout by simply loading the expected return address into % rax (the register rax) and leaving stdout open. The call to close stdout often occurs in the epilogue of functions. While this operation is unlikely to be covered by common test suites, it is also unlikely to negatively affect program execution. So, while this mutation represents what appears to be a significant change in instruction semantics (dropping the close stdout call entirely), it results in equivalent program behavior, yielding an identical system state shortly after program termination.

To manage large sets of transforms, it is possible to use an SQLite database consisting of a single table. Columns in the table can consist of: original hex bytes; original assembly; transformed hex bytes; transformed assembly; counter for applications; counter for successes; and a validity flag. The hex bytes facilitate application of the transformations in-place by searching for and overwriting portions of the binary file. The assembly is stored for the benefit of analysis, providing a representation of the transform which is easier to read. The applications counter keeps track of how many times a transform has been applied. The success counter keeps track of how many times a transform results in transformed programs which successfully pass their test suites. These counters are important in eliminating candidate transforms earlier in the process, as in one embodiment of Method 10, candidate transforms were applied to the full test suite at Step $10_f$ only if the number of attempts and successes were equal. Candidate transforms that are validated against the larger test suite are marked as valid, invalid, or skipped in the validity flag column. Invalid transforms resulted in programs which failed one or more of the coreutils test scripts.

The present inventive Method 10 achieves novel improvements by allowing the use of genetic algorithms to produce program variants, and then learning "semantics preserving transforms" from the variants produced. Once a set of variants is collected, they can be applied freely and inexpensively to other programs. Each transform can then be used to modify any program, transforming one set of instructions into a new set of instructions. This process differs substantially from the way traditional program transform mechanisms work in modern, state-of-the-art software compilers. The semantic transform rules are currently hand-crafted. By contrast, the present inventive Method 10 allows semantic preserving transforms to be discovered automatically from a population of program binaries. Once these transforms are learned, they may be used to modify programs that the genetic algorithm has not seen before. Stated differently, Method 10 facilitates the automated discovery of transforms which can be applied to new programs.

Previously, the software industry has not needed or desired to take programs and mutate them in order to generate new programs. However, the present inventive Method 10 offers a number of novel benefits to the computer technology by leveraging program mutation as a means of generating programs with unique properties. These properties include: decreasing the number of program vulnerabilities; eliminating software bloat through the removal of features; randomizing software structure and internal semantics to prevent software exploitation; and reducing the need for human-guided program modification. To these ends, application of Method 10 can lead to a substantial increase in the number of transforms which are available for these purposes. Current approaches (which hand-code transforms) are very labor intensive and expensive. The current hand-coded transforms also tend to be language and architecture specific. With current hand-coded transforms, when a new architecture is released, or when an existing processor architecture is modified, new transforms generally need to be constructed. The present inventive Method 10 automates the discovery of transforms, which means that when a new processor architecture or architecture variant is released, the Method 10 can be used to find new transforms in a low cost and automated way. In addition to being automated, Method 10 can be repeated for any programming language, binary format, operating system, or processor architecture.

One embodiment of the invention may be an algorithm in which a genetic algorithm is not used, but in which different versions of the same program are directly compared against one another to produce candidate transforms. The benefit of this embodiment is that there is no computing cost incurred for running the genetic algorithm. The downside is that it will result in a more limited number of candidate transforms. The number of candidate transforms produced by this alternative can be expanded by increasing the number of different program variants by using a larger number of different versions of a software application. For example, rather than simply using the current version of a program (e.g., version 9.2 and the previous version 9.1), using a larger number of prior versions (e.g., versions 1.0 through 9.2) and builds will generate a larger pool of sample binaries for comparison.

Another embodiment of the invention may be an algorithm in which a brute force method is used to generate program transformations (rather than through heuristic search using a genetic algorithm). A benefit of this approach is that it is deterministic and covers all possible transforms. However, the computing cost is much greater, as all possible transforms are considered, increasing the search space.

Another embodiment of the invention focuses on only subsets of the program's internal contents. If the genetic algorithm is allowed to edit any portion of the program, then the search space for binaries is very large. However, there may be regions of the target program binary that have more interesting instructions. If these more interesting regions are used to produce transforms, this would result in transforms with greater variations. Several different approaches could be used to determine the program regions to modify. The program could be profiled in order to measure which regions of the program are most often used when it is executed. These regions could be marked for mutation or the mutation operations could be biased to occur more often on regions of the executable which are executed frequently. This would cause the genetic algorithm to mutate regions of the program which are key to its proper operation. This will cause a large number of the mutated variants to fail their execution tests. The mutations that pass muster will have a greater chance of being valid semantic preserving transforms when applied to other programs during transform validation steps.

In another embodiment, regions could be marked for mutation based on frequency counts of the number of unique instructions or opcodes used. Regions with high variability for the instructions which are used would allow the genetic algorithm to discover more quickly transforms that include instructions having very different opcodes (e.g., such as swapping MOV for EXCH). Alternatively, each of these approaches could be inverted to either bias mutations away from "hot" code or away from regions with high entropy. Combinations of these approaches can also be used to bias the mutation operations to particular regions of code.

Another embodiment would use programs that have been compiled for different architectures during the genetic mutation. This would allow the genetic algorithm to use instructions for algorithms which are similar, but have additional opcodes or variations in the number of available opcodes (e.g., the MMX versus non-MMX instruction sets for Intel processors). Genetic algorithms could use donor instructions for processor architectures that are meant to be equivalent, but may differ in the specific details of the opcodes used, the available processor registers, or other technical implementation details. Such an embodiment could produce transforms which could be used to transform a binary from being compatible with processor architecture A to being compatible with processor architecture B. The test suite for this embodiment would have to be modified to allow for the testing of transforms applied to both architecture A and architecture B.

Another embodiment would use programs binaries which have been extended with donor binaries during genetic mutation. Use of donor binaries allow the total number of available instructions for a program to be expanded by appending a second, potentially unrelated binary to the end of the first binary. In embodiments in which only the first program binary is used, the total variety of instructions will be limited to those which already exist in the first program. If a second program is used, then the instructions in this second program will be available for crossover mutations (where mutations in the first program are replaced with instructions from the second program).

Another embodiment would start the genetic algorithm with multiple binary versions of the same program generated by compiling with different levels of compiler optimizations involved. From this starting pool, binary transformations can be discovered which are the binary equivalents of the compiler optimizations. Once the set of optimization transformations is learned, a slow program (for which the source code is not accessible) can be easily optimized b applying the same optimizations a compiler would use.

In additional embodiments, allowing mutation units in the mutation operations to span multiple instructions may yield additional candidate transforms. Performance or memory profiling could also be used to guide mutations, thus decreasing the number of epochs to achieve a particular fitness criteria. Additionally, programming dynamic tracing of software to determine which portions of programs are actually covered by a particular test suit could refine the results. In this case, program mutations could be constrained to portions of the program which are likely to have been exercised by the available tests. Program regions which never executed through test cases could be excluded from mutation operations entirely. This technique would mitigate many issues with untested features being excised or inadvertently modified.

From the above description of the present invention, it is manifest that various techniques may be used for implementing its concepts without departing from the scope of the claims. The described embodiments are to be considered in all respects as illustrative and not restrictive. The method disclosed herein may be practiced in the absence of any element that is not specifically claimed and/or disclosed herein. It should also be understood that the present invention is not limited to the particular embodiments described herein, but is capable of being practiced in many embodiments without departure from the scope of the claims.

What is claimed is:

1. A computer system with at least one processor for executing instructions for generating validated software transforms, the instructions from a non-transitory storage media causing the at least one processor to perform steps comprising:

mutating a target program binary, producing a plurality of variants;

determining whether each variant of the variants passes a test suite;

upon determining the variant does not pass the test suite, discarding the variant;

upon determining the variant passes the test suite:

extracting a candidate transform that describes a difference between the target program binary and the variant;

applying the candidate transform to each of a plurality of test programs;

determining whether the candidate transform is safe;

upon determining the candidate transform is not safe, discarding the candidate transform; and upon determining the candidate transform is safe, collecting the candidate transform as one of the validated software transforms.

2. The computer system of claim 1, wherein the target program binary is mutated using genetic mutation.

3. The computer system of claim 1, wherein the mutation step comprises a swapping code step.

4. The computer system of claim 1, wherein the mutation step comprises an inserting code step.

5. The computer system of claim 1, wherein the mutation step comprises a deleting code step.

6. The computer system of claim 1, wherein the variants are produced using a crossover combination technique.

7. The computer system of claim 6, wherein the crossover combination technique is a two-point technique.

8. The computer system of claim 1, wherein the variants are produced using tournament selection.

9. The computer system of claim 1, wherein the candidate transform is extracted by comparing a disassembled output of the target program binary with a disassembled output of the variant, and the candidate transform describes the difference between the disassembled outputs of the target program binary and the variant.

10. The computer system of claim 1, wherein at the applying the candidate transform to each of the plurality of test programs step, the candidate transform is applied to an executable section of the test program.

11. The computer system of claim 1, wherein at the applying the candidate transform to each of the plurality of test programs step, the test programs are a plurality of test programs other than the target program binary and the variants.

12. The method computer system of claim 1, wherein at the determining whether the candidate transform is safe step, the candidate transform T is considered safe if, for each test program F of the test programs, the test program P and a variant P'=T(P) produced during the applying are functionally equivalent because both P and P' pass a respective test suite for the test program P.

13. A computer system with at least one processor for executing instructions for generating validated software transforms, the instructions from a non-transitory storage media causing the at least one processor to perform steps comprising:

mutating a target program binary, producing a plurality of variants of the target program binary;

determining whether each variant of the variants passes a test suite for the target program binary;

upon determining the variant does not pass the test suite, discarding the variant;

upon determining the variant passes the test suite:

extracting a candidate transform that describes a difference between a disassembled output of the target program binary and a disassembled output of the variant;

applying the candidate transform to each test program binary of a plurality of additional program binaries, producing a variant of the test program binary;

determining whether the candidate transform is safe, wherein the candidate transform is considered safe if, for each test program binary of the additional program binaries, the variant of the test program binary passes a respective test suite for the test program binary;

upon determining the candidate transform is not safe, discarding the candidate transform; and upon determining the candidate transform is safe, collecting the candidate transform as one of the validated software transforms.

14. The computer system of claim 13, wherein the mutation step comprises a code swapping step.

15. The computer system of claim 13, wherein the mutation step comprises an inserting code step.

16. The computer system of claim 13, wherein the mutation step comprises a deleting code step.

17. The computer system of claim 13, wherein the variants are produced using a crossover combination technique.

18. The computer system of claim 13, wherein the variants are produced using tournament selection.

19. The computer system of claim 13, wherein at the applying the candidate transform to each test program binary of a plurality of additional program binaries step, the candidate transform is applied to a .text section of the test program binary.

20. A computer system with at least one processor for executing instructions for generating validated software transforms, the instructions from a non-transitory storage media causing the at least one processor to perform steps comprising:

mutating a target program binary using genetic mutation, producing a plurality of variants of the target program binary using a crossover combination technique and tournament selection, wherein the crossover combination technique is a two-point technique;

determining whether each variant of the variants passes a test suite for the target program binary;

upon determining the variant does not pass the test suite, discarding the variant;

upon determining the variant passes the test suite:

extracting a candidate transform by comparing a disassembled output of the target program binary with a disassembled output of the variant, the candidate transform describing a difference between the disassembled outputs of the target program binary and the variant within a window scope criteria;

applying the candidate transform to each test program binary of a plurality of additional program binaries, producing a variant of the test program binary, wherein the candidate transform is applied to a .text section of the test program binary;

determining whether the candidate transform is safe, wherein the candidate transform is considered safe if, for each test program binary of the additional program binaries, the variant of the test program binary passes a respective test suite for the test program binary;

upon determining the candidate transform is not safe, discarding the candidate transform; and upon determining the candidate transform is safe, collecting the candidate transform as one of the validated software transforms.

\* \* \* \* \*